United States Patent
Yoakum et al.

(10) Patent No.: US 9,185,169 B2
(45) Date of Patent: Nov. 10, 2015

(54) METHODS, SYSTEMS, AND COMPUTER-READABLE MEDIA FOR SELF-LEARNING INTERACTIVE COMMUNICATIONS PRIVILEGES FOR GOVERNING INTERACTIVE COMMUNICATIONS WITH ENTITIES OUTSIDE A DOMAIN

(75) Inventors: John H. Yoakum, Cary, NC (US); Venkatesh Krishnaswamy, Holmdel, NJ (US); Eunsoo Shim, Princeton Junction, NJ (US)

(73) Assignee: Avaya Inc., Basking Ridge, NJ (US)

( * ) Notice: Subject to any disclaimer, the term of this patent is extended or adjusted under 35 U.S.C. 154(b) by 528 days.

(21) Appl. No.: 13/194,341

(22) Filed: Jul. 29, 2011

(65) Prior Publication Data
US 2013/0031243 A1    Jan. 31, 2013

(51) Int. Cl.
| H04L 9/32 | (2006.01) |
| H04L 29/08 | (2006.01) |
| H04L 29/06 | (2006.01) |
| H04L 29/12 | (2006.01) |
| H04L 12/58 | (2006.01) |

(52) U.S. Cl.
CPC .......... *H04L 67/141* (2013.01); *H04L 61/1511* (2013.01); *H04L 65/1076* (2013.01); *H04L 65/1096* (2013.01); *H04L 51/14* (2013.01)

(58) Field of Classification Search
USPC ......... 709/224; 726/1, 3, 5; 705/50; 370/331, 370/252; 713/168
See application file for complete search history.

(56) References Cited

U.S. PATENT DOCUMENTS

| 6,463,460 | B1 | 10/2002 | Simonoff |
| 8,549,622 | B2 | 10/2013 | Byrne et al. |
| 8,799,983 | B2 | 8/2014 | Yoakum |
| 8,966,589 | B2 | 2/2015 | Yoakum |
| 2002/0010917 | A1 | 1/2002 | Srikantan et al. |
| 2003/0215067 | A1 | 11/2003 | Ordille et al. |
| 2004/0268153 | A1 | 12/2004 | Goldthwaite et al. |
| 2005/0153686 | A1 | 7/2005 | Kall et al. |

(Continued)

OTHER PUBLICATIONS

Non-Final Office Action for U.S. Appl. No. 13/216,892, mailed Mar. 28, 2013, 22 pages.

(Continued)

*Primary Examiner* — Kyung H Shin
(74) *Attorney, Agent, or Firm* — Withrow & Terranova, PLLC

(57) ABSTRACT

Methods, systems, and computer-readable media for self-learning interactive communications privileges for governing interactive communications with entities outside a domain are disclosed. The interactive communications privileges can be used to process interactive communications requests between entities inside and outside a domain. The requested interactive communications are allowed if the interactive communications privileges configured for the entity outside the domain allow for the requested interactive communications. The interactive communications privileges are determined in an automated, self-learning manner in response to monitoring communication interactions between the entities inside and outside the domain. In this manner, the interactive communications privileges are not required to be provisioned and maintained by an administrator. The interactive communications privileges can be determined by gathering insight about the entities outside the domain. Insight about an entity outside the domain is information that is useful in determining which interactive communications privileges to configure for an entity outside the domain.

23 Claims, 9 Drawing Sheets

(56) References Cited

U.S. PATENT DOCUMENTS

| | | |
|---|---|---|
| 2005/0257099 A1 | 11/2005 | Bounkong et al. |
| 2006/0095514 A1 | 5/2006 | Wang et al. |
| 2007/0022289 A1* | 1/2007 | Alt et al. ............... 713/168 |
| 2007/0073880 A1 | 3/2007 | Krishnakumar et al. |
| 2007/0156900 A1 | 7/2007 | Chien |
| 2008/0022355 A1 | 1/2008 | Khosravi et al. |
| 2008/0098485 A1 | 4/2008 | Chiou |
| 2009/0025059 A1 | 1/2009 | Wang et al. |
| 2009/0293099 A1 | 11/2009 | Yoakum |
| 2010/0045426 A1 | 2/2010 | Kakuta et al. |
| 2010/0049573 A1* | 2/2010 | Kantorova et al. ............... 705/9 |
| 2011/0078081 A1 | 3/2011 | Pirzadeh et al. |
| 2011/0179469 A1 | 7/2011 | Blinn et al. |
| 2011/0191847 A1 | 8/2011 | Davis et al. |
| 2011/0209193 A1 | 8/2011 | Kennedy |
| 2011/0219434 A1* | 9/2011 | Betz et al. ............... 726/5 |
| 2012/0011587 A1 | 1/2012 | Byrne et al. |
| 2012/0014271 A1* | 1/2012 | Damenti ............... 370/252 |
| 2012/0197967 A1 | 8/2012 | Sivavakeesar |
| 2012/0303808 A1 | 11/2012 | Xie |
| 2013/0055355 A1 | 2/2013 | Yoakum |
| 2013/0097292 A1 | 4/2013 | Yoakum et al. |

OTHER PUBLICATIONS

Advisory Action for U.S. Appl. No. 13/216,892 mailed Dec. 20, 2013, 3 pages.

Final Office Action for U.S. Appl. No. 13/216,892, mailed Oct. 2, 2013, 25 pages.

Non-Final Office Action for U.S. Appl. No. 13/275,951, mailed Sep. 11, 2013, 16 pages.

Non-Final Office Action and Examiner-Initiated Interview Summary for U.S. Appl. No. 13/216,892, mailed May 29, 2014, 23 pages.

Final Office Action for U.S. Appl. No. 13/275,951, mailed May 6, 2014, 17 pages.

Notice of Allowance for U.S. Appl. No. 13/216,892, mailed Nov. 21, 2014, 9 pages.

Advisory Action and Applicant-Initiated Interview Summary for U.S. Appl. No. 13/275,951, mailed Aug. 7, 2014, 5 pages.

Non-Final Office Action for U.S. Appl. No. 13/275,951, mailed Dec. 15, 2014, 16 pages.

Final Office Action for U.S. Appl. No. 13/275,951, mailed Jul. 9, 2015, 17 pages.

* cited by examiner

METHODS, SYSTEMS, AND COMPUTER-READABLE MEDIA FOR SELF-LEARNING INTERACTIVE COMMUNICATIONS PRIVILEGES FOR GOVERNING INTERACTIVE COMMUNICATIONS WITH ENTITIES OUTSIDE A DOMAIN

BACKGROUND

1. Field of the Disclosure

The technology of the disclosure relates to configuring communications privileges in a domain/domain server for communications involving entities outside the domain.

2. Technical Background

Traditional switch-based phone communication systems provide simple mechanisms to allow a called party to control interactions with a calling party. For example, voice mail is one form of controlling interactions. If a called party does not answer a phone call from a calling party, the calling party may leave a voice mail for the called party. The called party phone calls may also be automatically directed to voice mail. In either scenario, the called party can retrieve the voice mail at their convenience and decide if a return phone call will be made to the calling party. Caller identification, also known as "caller id," is another form of controlling interactions. The called party can review the caller id of the calling party to identify the calling party and decide if the calling party phone call will be answered.

The Internet provides an infrastructure for establishing communications using data packet-based communications between entities. The entities may be user devices. A common example is e-mail communications. For example, Session Initiation Protocol (SIP) was developed as one signaling protocol that could be used for establishing communications sessions in an Internet Protocol (IP) network. Voice over IP was also promoted adopting SIP as one protocol of choice. With SIP and other Internet protocols developed for Internet communications, users or entities are identified by their associated domains. Domain names are used as part of a simple identification label under the Domain Name System (DNS) to indicate in which domain a user or other entity is associated. Other identification information, such as a user identification tag or address, can be associated with a domain name to provide a complete identification of a unique user or entity. Thus, one method of a first user or entity requesting to establish communications with a second user or entity, is for the first domain of the first user or entity to request contact with a second domain associated with the second user. The first domain server can make a DNS server request to find the IP address of the second domain server associated with the second domain user or entity to be contacted so that communications can be established. Thereafter, the first domain server can send an invite to the second user or entity at the second domain. If the second domain determines that the second user or entity exists within its domain, the invite can be handed off from the second domain server to the second user or entity to establish communications with the first user or entity.

One problem with this architecture for IP communications is that an outside system can spam users or entities in a given domain. An outside system can randomly make up addresses for a given domain to unsolicitedly contact users or entities in the domain. In this regard, domain servers may employ enterprise application software (EAS) in enterprise system configurations executed on a domain server to address spam and decide which communications are to be forwarded to its users or entities within its domain. A common example involves email communications. Enterprise systems may discriminate which email communications are forwarded to an addressed user or entity in its domain based on the address and/or domain of the user or entity outside the domain requesting email communications. However, this poses an issue for interactive communications, such as voice and video communications, as examples. For interactive communications, parsing and filtering may not maintain the interactive nature and integrity of the communications. Further, it may be desired to filter communications differently between users or entities within the same domain as opposed to communications outside a domain. Thus because of these issues, many enterprise systems choose not to employ SIP or other IP signaling protocols for communications with other systems outside its domain. The rationale is the potential of being flooded with unwanted invites and having to provide different filtering configurations based on whether communications are within the domain or with entities outside of the domain.

In response, federated database systems or federation systems have been developed and deployed in enterprise systems. Federation systems allow an administrator to setup and predefine, or provision, security rules or privileges ("federation rules") for IP communications from an outside domain to control relationships to users inside the domain of the enterprise system. For example, a federation system may be configured to allow SIP voice calls from an outside domain, but not allow SIP video calls from the outside domain. Further, these federation rules may be set on an individual user basis or particular groups or communities of users. A problem with federation systems is that over time, the federation rules become massive and difficult for administrators to maintain as a result of constant provisioning and relationships becoming outdated. The rules become too numerous and complex to effectively manage. Further, configuring communities of users often lacks enough granularity and often, multiple communal relationships are required thereby requiring additional federation rules. Further, as federation rules are configured for additional outside domains with users or entities that are members of different domains, additional federation systems may be required to be deployed further increasing complexity and federation rule maintenance issues.

Accordingly, there is a need for effectively and efficiently providing a way to configure and maintain privileges for interactive communications between users and entities within different domains that scales well as complexity increases.

SUMMARY OF THE DETAILED DESCRIPTION

Embodiments disclosed in the detailed description include methods, systems, and computer-readable media for self-learning interactive communications privileges for governing interactive communications with entities outside a domain. As a non-limiting example, the domain may include enterprise systems. The interactive communications privileges can be used to process interactive communications requests between entities inside a domain and entities outside the domain. An entity can be an individual user within a domain, or a domain itself where multiple individual users are represented by the domain, or all known users in a domain. The requested interactive communications are allowed if the interactive communications privileges configured for the entity outside the domain allow for the requested interactive communications. The interactive communications privileges are determined in an automated, self-learning manner in response to monitoring communications interactions between the entities outside the domain and entities inside the domain. In this manner, the interactive communications privileges are not required to be provisioned and maintained by an administrator. The interactive communications privileges can be determined by gathering insight information about the entities outside the domain. The insight information about an entity outside the domain is information that is useful in determining which interactive communications privileges to configure for an entity outside the domain. As non-limiting examples, insight information can include interactive communications capabilities, permissions, associations, trustworthiness, and/or reputation information.

In this regard in one embodiment, a method for providing a self-learning interactive communications privilege configuration for an entity outside a domain is provided. The method includes monitoring communication of an entity inside the domain. The method also includes determining if the communication involves an entity outside the domain. If the communication involves an entity outside the domain, the method further includes as follows. The method further includes gathering insight information about the entity outside the domain and determining possible interactive communications privileges for the entity outside the domain based on the insight information. The method further includes sending the possible interactive communications privileges for the entity outside the domain to the entity inside the domain. The method further includes receiving a selection from the entity inside the domain of the possible interactive communications privileges for the entity outside the domain. The method further includes storing the selection of the interactive communications privileges for the entity outside the domain.

In another embodiment, a system for providing an interactive communications privilege configuration for an entity outside a domain is disclosed. In this embodiment, the system includes at least one communications interface associated with the domain. The system also includes a control system associated with the at least one communications interface and the domain. The control system is configured to monitor communication of an entity inside the domain. The control system is further configured to determine if the communication involves an entity outside the domain. If the communication involves an entity outside the domain, the control system is further configured as follows. The control system is further configured to gather insight information about the entity outside the domain. The control system is further configured to determine possible interactive communications privileges for the entity outside the domain based on the insight information. The control system is further configured to send the possible interactive communications privileges for the entity outside the domain to the entity inside the domain. The control system is further configured to receive a selection from the entity inside the domain of the possible interactive communications privileges for the entity outside the domain. The control system is further configured to store the selection of the interactive communications privileges for the entity outside the domain.

In another embodiment, a computer-readable medium is provided. The computer-readable medium has stored thereon computer executable instructions to cause a control system associated with the at least one communications interface and a domain to monitor communication of an entity inside the domain, and determine if the communication involves an entity outside the domain. If the communication involves an entity outside the domain, the computer-readable medium has stored thereon computer executable instructions to cause a control system associated with the at least one communications interface and a domain to gather insight information about the entity outside the domain, determine possible interactive communications privileges for the entity outside the domain based on the insight information, send the possible interactive communications privileges for the entity outside the domain to the entity inside the domain, receive a selection from the entity inside the domain of the possible interactive communications privileges for the entity outside the domain, and store the selection of the interactive communications privileges for the entity outside the domain.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
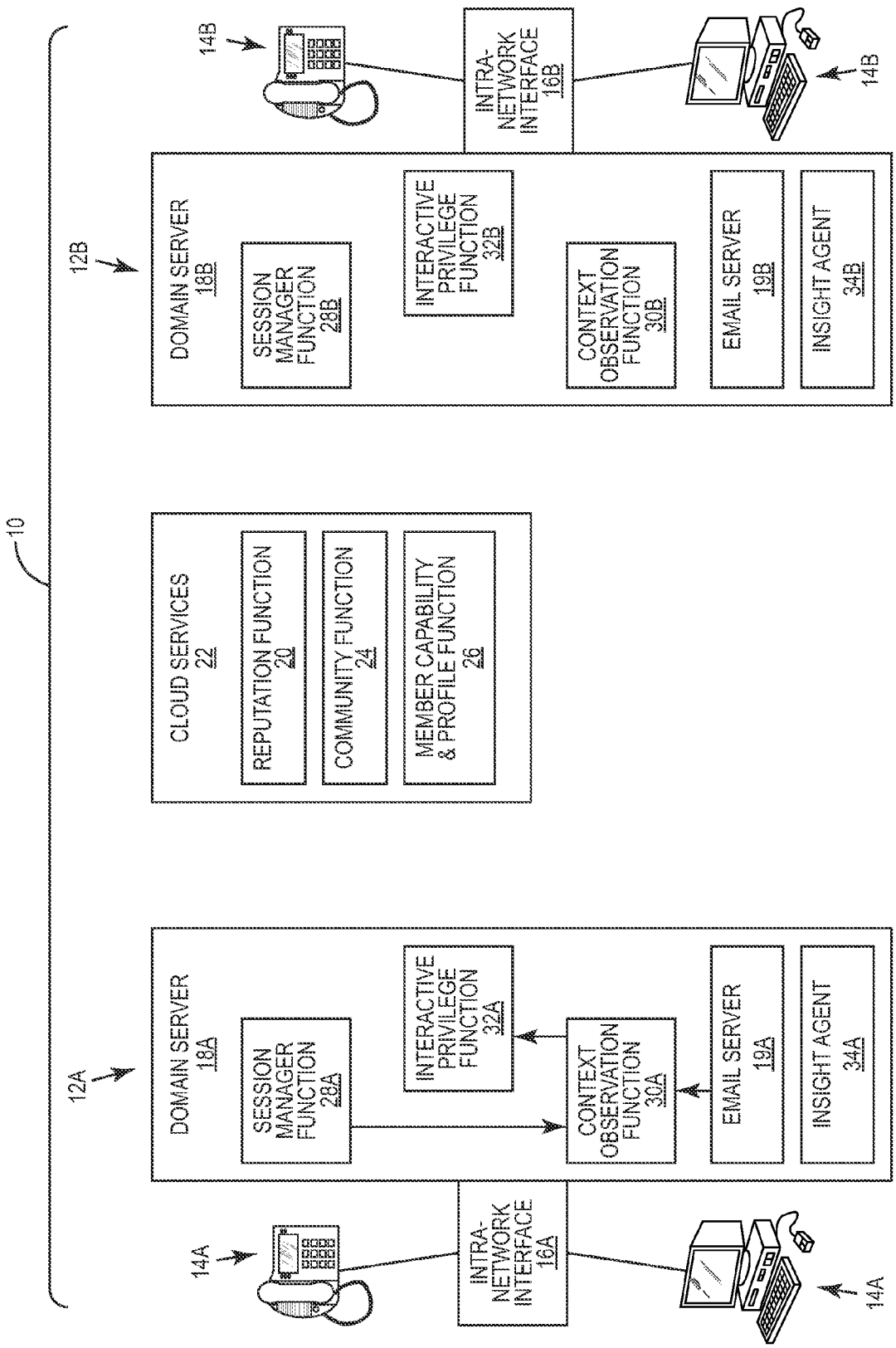
FIG. 1 is a block diagram of an exemplary system that includes domains configured to self-learn interactive communications privileges for communications with entities outside the domain.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include methods, systems, and computer-readable media for self-learning interactive communications privileges for governing interactive communications with entities outside a domain. As a non-limiting example, the domain may include enterprise systems. The interactive communications privileges can be used to process interactive communications requests between entities inside a domain and entities outside the domain. An entity can be an individual user within a domain, or a domain itself where multiple individual users are represented by the domain, or all known users in a domain. The requested interactive communications are allowed if the interactive communications privileges configured for the entity outside the domain allow for the requested interactive communications. The interactive communications privileges are determined in an automated, self-learning manner in response to monitoring communications interactions between the entities outside the domain and entities inside the domain. In this manner, the interactive communications privileges are not required to be provisioned and maintained by an administrator. The interactive communications privileges can be determined by gathering insight information about the entities outside the domain. The insight information about an entity outside the domain is information that is useful in determining which interactive communications privileges to configure for an entity outside the domain. As non-limiting examples, insight information can include interactive communications capabilities, permissions, associations, trustworthiness, and/or reputation information.

Before examples of methods, systems, and computer-readable media for self-learning interactive communications privileges for governing interactive communications with entities outside a domain are discussed, an exemplary system in which these functions may be provided is first discussed. In this regard, FIG. 1 illustrates such an exemplary system 10. The system 10 in this example includes two exemplary domains 12A, 12B, although any number of domains can be included in the system 10. The domains 12A, 12B identify a realm of administrative autonomy, authority, or control that is governed by a common set of rules. The domains 12A, 12B may have associated domain names that provide an identification label for identifying the domains 12A, 12B for communications in the Internet (e.g., [identification_label].com). In this example, each domain 12A, 12B is configured to support a plurality of user devices 14A, 14B connected via intra-network interfaces 16A, 16B, respectively, to the domain 12A, 12B. The user devices 14A, 14B are examples of entities. Entities with the domains 12A, 12B can also involve other devices that are not necessarily user devices or user controlled. The user devices 14A, 14B could be, as examples, IP telephones, computers, and other network devices.

The domains 12A, 12B may each include domain servers 18A, 18B, respectively, that contain a collection of computer programs that collectively serve the needs of the domain. For example, the domain servers 18A, 18B may be enterprise servers or enterprise domain servers. One service provided by the domain servers 18A, 18B is supporting communications between user devices 14A, 14B within the same domain 12A, 12B, also referred to as intra-domain communications. The domain name is not required for intra-domain communications. The domain servers 18A, 18B also support inter-domain communications between user devices 14A, 14B in different domains 12A, 12B. In inter-domain communications, the domain names form part of the identification of the user devices 14A, 14B to identify their respective domains. It should be understood that for the sake of simplicity of explanation domain servers 18A, 18B are illustrated as single servers with and the functions shown within these servers can be implemented all in a single server or in several servers that interact with each other to accomplish the overall set of functions described in relation to domain servers 18A, 18B.

With continuing reference to FIG. 1, each domain server 18A, 18B may contain a respective email server 19A, 19B. The email servers 19A, 19B include applications that receive and process email messages from entities or clients within their domains 12A, 12B, and entities outside their domains 12A, 12B. Email messages are a form of asynchronous communications. Email messages are not generally thought of as interactive communications. Interactive communications typically include communications that involve synchronous interaction, such as voice, video, instant messaging, as non-limiting examples. The email servers 19A, 19B contain storage area for storing emails and rules that govern how the email servers 19A, 19B should react when determining the destination of a specific message or how to reach to a sender of the message. The email messages processed by the email servers 19A, 19B include sender and destination addresses. If an email message is intended to be sent to another entity inside the same domain as the domain of the sender, a domain name may not be required to be included in the recipient address. If an email message is intended to be sent to an entity outside the domain of the sender, a domain name is included in the recipient address.

With continuing reference to FIG. 1, as will be discussed in more detail below, each of the domain servers 18A, 18B are configured to self-learn interactive communications privileges for entities located outside of their respective domains. The interactive communications privileges can be used to process interactive communications requests between entities inside a domain and entities outside the domain. The requested interactive communications are allowed if the interactive communications privileges configured for the entity outside the domain allow for the requested interactive communications. An entity can be an individual user within a domain, or a domain itself where multiple individual users are represented by the domain, or all known users in a domain. The interactive communications privileges are determined in an automated, self-learning manner in response to monitoring communications interactions between the entities outside the domain and entities inside the domain. In this manner, the interactive communications privileges are not required to be provisioned and maintained by an administrator. In this example, user devices 14A are entities inside the domain 12A, and user devices 14B are entities inside the domain 12B. User devices 14B are entities outside of the domain 12A, and user devices 14A are entities outside the domain 12B. It may be important for the domain servers 18A, 18B, to control communications with entities inside their domain (e.g., user devices 14A, 14B, respectively), and entities outside their domain (e.g., user devices 14B, 14A, respectively).

The domain servers 18A, 18B control establishing of communications between entities inside and outside their respective domains 12A, 12B. The domain servers 18A, 18B make decisions whether or not to allow communications to be established with entities outside their respective domains 12A, 12B. Whether establishing of communications is allowed can be based on server factors or information. This information can be included in the identity of the domain, the membership communities of the entity outside the domain, the reputation of the entity outside the domain, the trustworthiness of the entity outside the domain, and/or the communication capabilities of the entity outside the domain, as non-limiting examples. Each of these types of information are examples of insight information that is useful in determining whether establishing of interactive communications should be allowed, and if so, what types of communications, media flows, information exchanges, availability insight, and other nuances of interactive communications are permissible.

As one example of insight information, the reputation of an entity outside a domain may be determined by the domain servers 18A, 18B by calling upon a reputation function 20. The reputation of an entity can be the reputation of the domain if the entity is the domain. In this example, all user entities within the domain in essence inherit the reputation of the domain. Alternatively, the reputation of an entity can be the reputation of an individual user or groups of users within a domain. As illustrated in FIG. 1, the reputation function 20 may be provided in cloud services 22 external to the domains 12A, 12B. The reputation service 20 in the cloud services 22 may be called upon by a domain server 18A, 18B. The reputation function 20 contains reputation information regarding entities. The reputation of the entity outside a domain 12A, 12B may be used by a domain server 18A, 18B to determine whether to allow establishment of interactive communications with entities inside their respective domains 12A, 12B, and if so, what type of interactive communications to allow. The reputation function 20 could also be provided outside of the cloud services 22, including in internal domains and outside domains, including either of domains 12A, 12B.

As another example of insight information, the communities in which an entity outside a domain is a member or a part of may be determined by the domain server 18A, 18B by calling upon a community function 24. For example, an entity may belong to a community of a SIP programmers group. Communities can also involve societal, professional, technical, business, and other groups and affiliations. A domain itself may belong to a community and insight about this membership of the domain may be considered by domain server 18A, 18B. As illustrated in FIG. 1, the community function 24 may be provided in cloud services 22 external to the domains 12A, 12B which may be called upon as a service to call upon the community function 24. The community function 24 could also be provided outside of the cloud services 22, including in other domains, including domain servers 18A, 18B. The community function 24 contains community information regarding entities. The communities in which an entity outside a domain is a member or part of may be used by a domain server 18A, 18B to determine whether to allow establishment of interactive communications with entities inside their domains 12A, 12B, respectively, and if so, what type of interactive communications to allow.

As another example of insight information, the interactive communications capabilities or profile of an entity outside a domain may be determined by the domain server 18A, 18B by calling upon a member capability and profile function 26. As illustrated in FIG. 1, the member capability and profile function 26 may be provided in cloud services 22 external to the domains 12A, 12B which may be called upon as a service to call upon the member capability and profile function 26. The member capability and profile function 26 could also be provided outside of the cloud services 22, including in other domains, including domain servers 18A, 18B. The member capability and profile function 26 contains capability and profile information regarding entities. For example, a given entity may only have capabilities to communicate in certain manners (e.g., email communications, but not video communications). As another example, a profile provided for an entity may provide for certain types of communications and not others (e.g., email communications, not video or whiteboard communications). The capabilities and/or profiles of entities outside a domain may be used by a domain server 18A, 18B to determine whether to allow establishment of interactive communications with entities inside their respective domains 12A, 12B, and if so, what type of interactive communications to allow. Those skilled in the art will recognize that other types of insight describing a domain 12A, 12B and/or entity may be acquired and used in a similar fashion to the examples described and all such forms of insight fall within the scope of this disclosure.

Each domain server 18A, 18B contains several components that facilitate intra-network and inter-network communications with entities inside their respective domains 12A, 12B, including their respective user devices 14A, 14B. For example, a session manager function 28A, 28B may be provided in each of the domain servers 18A, 18B. The session manager functions 28A, 28B control establishment of communication sessions between entities inside their respective domains 12A, 12B, and entities inside their domains 12A, 12B with entities outside their domains 12A, 12B. As an example, the session manager functions 28A, 28B may be configured to handle a particular signaling protocol or protocols to handle communication establishment requests and establishments, such as SIP for establishing sessions in an IP network. The ability of the session manager functions 28A, 28B to establish these sessions means that a host of innovative, interactive communications services may be possible. Non-limiting examples of these interactive communications services include voice, video, Instant Messaging, file share, availability insight, location insight, web share, and shared whiteboard.

As previously discussed, one problem with this architecture for IP communications is that an outside system can spam users or entities in a given domain. An outside system can randomly make up addresses for a given domain to unsolicitedly contact users or entities in the domain. Enterprise systems may discriminate which email communications are forwarded to an addressed user or entity in its domain based on the address and/or domain of the user or entity outside the domain requesting email communications. For interactive communications, parsing and filtering may not maintain the interactive nature and integrity of the communications. Further, it may be desired to filter communications differently between users or entities within the same domain as opposed to communications outside a domain. Thus because of these issues, many enterprise systems choose not to employ SIP or other IP signaling protocols for communications with other systems outside its domain. The rationale is the potential of being flooded with unwanted invites and having to provide different filtering configurations based on whether communications are within the domain or with entities outside of the domain.

In response, federated database systems or federation systems have been developed and deployed in enterprise systems. A problem with federation systems is that over time, the federation rules become massive and difficult for administrators to maintain as a result of constant provisioning and relationships becoming outdated. The rules become too numerous and complex to effectively manage. Further, configuring communities of users often lacks enough granularity and often, multiple communal relationships are required thereby requiring additional federation rules. Further, as federation rules are configured for additional outside domains with users or entities that are members of different domains, additional federation systems may be required to be deployed further increasing complexity and federation rule maintenance issues.

As a non-limiting example, the domain servers 18A, 18B in FIG. 1 are configured to allow for default email and voice communications without calling upon the interactive communications privileges, which are discussed in more detail below. Several components and functionalities are included in the domain servers 18A, 18B that govern interactive communications from entities outside their domains 12A, 12B. As will be discussed in more detail below and in response to the issues discussed above, these components and functionalities provide for self-learning of interactive communications privileges for governing interactive communications with entities outside their respective domains 12A, 12B.

Note that email and voice communications with entities outside the domain are allowed in this example regardless of whether interactive communications privileges have been established with the entity outside the domain. This is because the self-learning of interactive communications privileges for entities outside the domains 12A, 12B are triggered based on initial communications with entities inside the domains 12A, 12B with entities outside the domains 12A, 12B. Thus, some form of default communications (e.g., email and/or voice) between entities in a domain 12A, 12B and entities outside the domain 12A, 12B is provided and allowed regarding of interactive communications privileges configured for the entities outside the domain 12A, 12B. The interactive communications governed by the interactive communications privileges herein may be a richer set of communications types than those provide as default allowed communications types, such as email and/or voice communications as non-limiting examples. As non-limiting examples, interactive communications governed by the interactive communications privileges herein may be synchronous communications and/or real-time communications.

Figure 2:
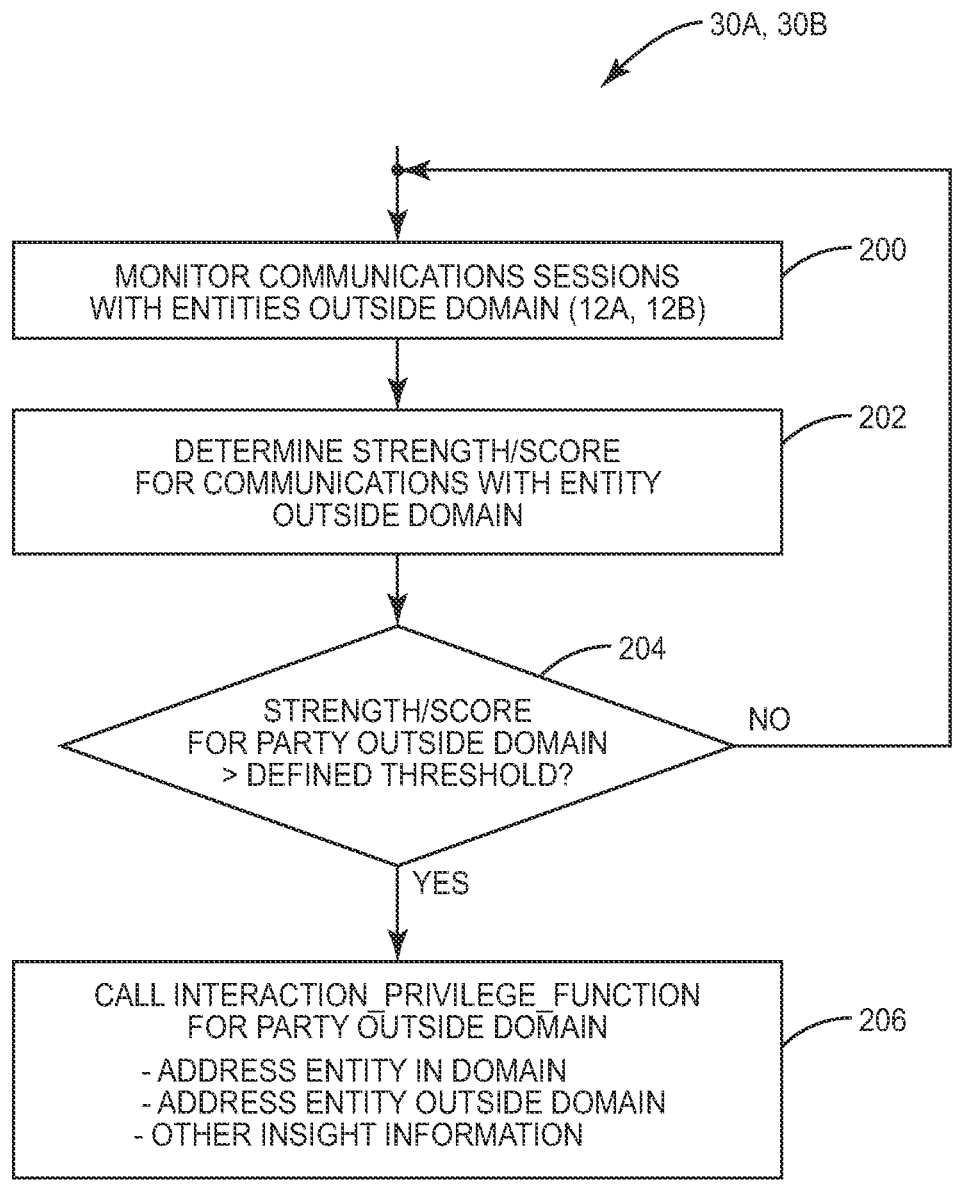
FIG. 2 is an exemplary flowchart illustrating exemplary functions of a contextual observation function configured to obtain contextual observation information about an entity outside the domain.

In this regard with references to FIGS. 1 and 2, each of the domain servers 18A, 18B include context observation functions 30A, 30B. The context observation functions 30A, 30B will be discussed with reference to FIGS. 1 and 2. FIG. 2 is a flowchart that illustrates exemplary operation of the context observation functions 30A, 30B. The context observation functions 30A, 30B monitor communications with entities inside their respective domains 12A, 12B, including communications between entities outside their respective domains 12A, 12B (block 200 in FIG. 2). As examples, the session manager functions 28A, 28B may either report communications to the context observation functions 30A, 30B, or the context observation functions 30A, 30B can poll the session manager functions 28A, 28B. In this example, the context observation functions 30A, 30B are not concerned with monitoring intra-domain communications—the entities inside the domains 12A, 12B are trusted and their interactive communications capabilities of are known. The context observation functions 30A, 30B determine the strength of the communications between entities inside their domains 12A, 12B and entities outside their domains 12A, 12B (block 202 in FIG. 2), because it may not be desired to attempt to self-learn interactive communications privileges for entities outside the domain 12A, 12B until a certain threshold of interactions with the entities outside the domain 12A, 12B have been exceeded. As an example, these communications may score the communications between entities inside the domains 12A, 12B and entities outside the domains 12A, 12B. The scoring may be based on the number and/or length of the communications as non-limiting examples.

With continuing reference to FIGS. 1 and 2, if the strength or score of the communications between an entity inside the domain 12A, 12B and an entity outside the domain 12A, 12B does not exceed a defined threshold (decision 204 in FIG. 2), the process repeats by continuing to monitor communication sessions (block 200 in FIG. 2). For example, the defined threshold may be a defined threshold communications level. If the strength or score of the communications between an entity inside the domain 12A, 12B and an entity outside the domain 12A, 12B does exceed a defined threshold (decision 204 in FIG. 2), the context observation functions 30A, 30B will call upon respective interactive privilege functions 32A, 32B in their domain servers 18A, 18B, as illustrated in FIG. 1 (block 206 in FIG. 2). As will be discussed in more detail below, the interactive privilege functions 32A, 32B determine interactive communications privileges for the entity outside the domain 12A, 12B. The interactive communications privileges will govern future interactive communications between entities inside their respective domain 12A, 12B and entities outside their respective domain 12A, 12B. The address of the entity inside the domain 12A, 12B and the address of the entity outside the domain 12A, 12B are passed to the interactive privilege functions 32A, 32B. Any other insight information about the entity outside the domain 12A, 12B available is also provided to the interaction privilege functions 32A, 32B. For example, the domain servers 18A, 18B may call upon respective insight agents 34A, 34B that can gather and/or provide insight information about entities. More information on insight agents that may be employed as the insight agents 34A, 34B herein is disclosed in U.S. patent application Ser. No. 12/125,644 filed on May 22, 2008 entitled "Insight Distribution," which is incorporated herein by reference in its entirety.

Figure 3:
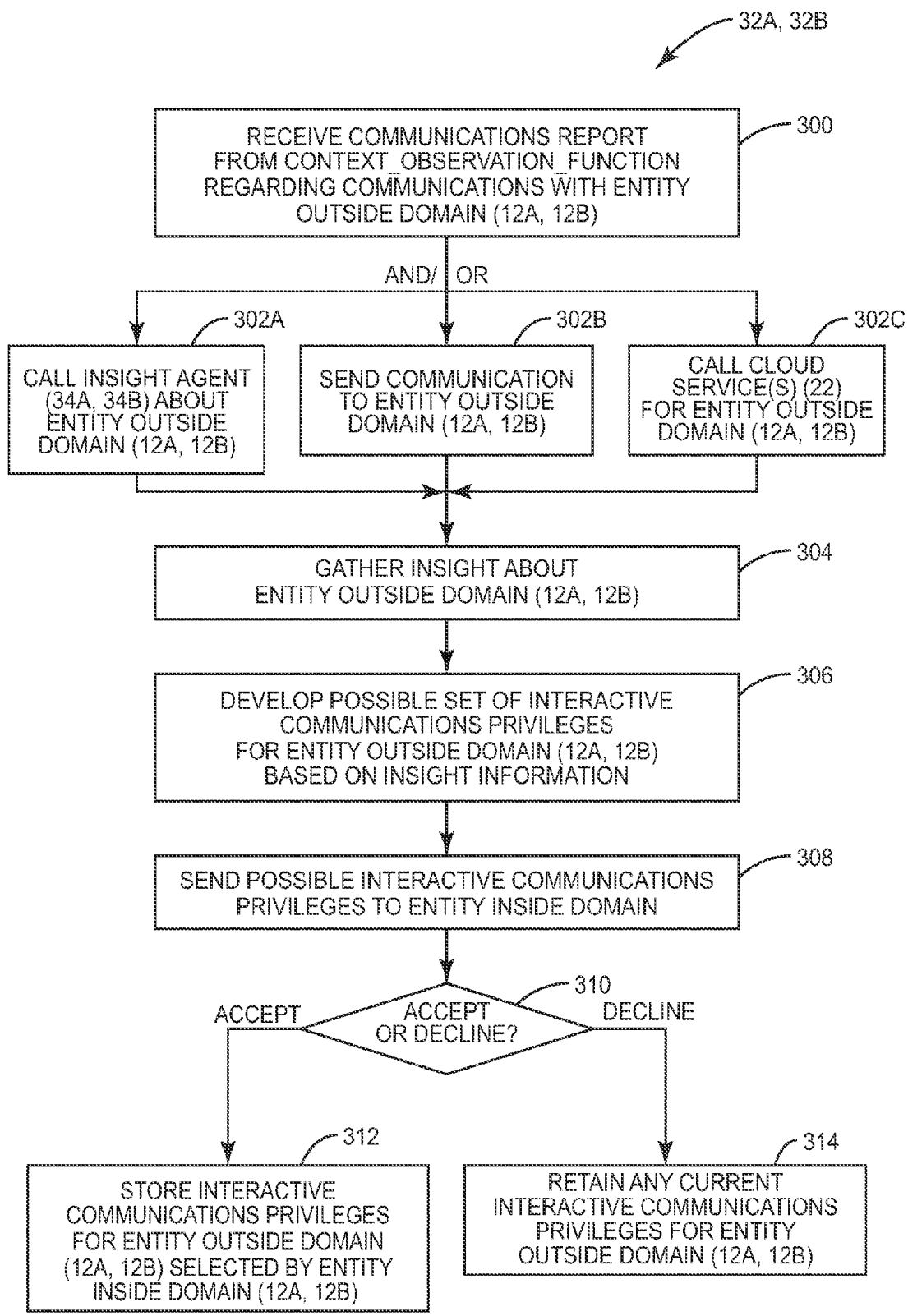
FIG. 3 is an exemplary flowchart illustrating exemplary functions of an interactive privilege function configured to provide self-learning interactive communications privilege configurations for an entity outside the domain.

FIG. 3 is an exemplary flowchart illustrating exemplary functionality of the interactive privilege functions 32A, 32B. The interactive privilege functions 32A, 32B are provided in the domain servers 18A, 18B and are configured to provide self-learning interactive communications privilege configurations for entities outside their respective domains 12A, 12B. The interactive privilege functions 32A, 32B receive a communications report from their respective context observation functions 30A, 30B regarding communications involving entities outside their respective domains 12A, 12B (block 300 in FIG. 3). As discussed above and illustrated in FIG. 2, the interactive privileges function 32A, 32B is only called upon in this embodiment if the interactions between an entity inside the domain 12A, 12B and an entity outside the domain 12A, 12B exceed a defined threshold (blocks 204, 206 in FIG. 2). The interactive privileges functions 32A, 32B will then determine insight about the entity outside the domain 12A, 12B to configure the interactive communications privileges for the entity outside the domain 12A, 12B.

In this regard, the interactive privileges functions 32A, 32B can call upon one or more resources that may be available to determine insight about the entity outside the domain 12A, 12B. Insight may be information that is useful in determining which interactive communications privileges to configure for an entity outside the domain. As non-limiting examples, insight information can include interactive communications capabilities, permissions, associations, trustworthiness, and/or reputation information. For example, the interactive privileges function 32A, 32B may call upon their respective insight agent 34A, 34B to determine insight about the entity outside the domain 12A, 12B (block 302A in FIG. 3). The interactive privileges function 32A, 32B may also send a communication to the entity outside the domain 12A, 12B to inquire as to their interactive communications capabilities or gain other insight about the entity outside the domain 12A, 12B (block 302B in FIG. 3). The interactive privileges function 32A, 32B may also call upon one or more of the cloud services 22 to determine insight about the entity outside the domain 12A, 12B (block 302C in FIG. 3). The interactive privileges functions 32A, 32B may call upon any number of these insight sources to gather insight about the entity outside the domain as illustrated in the system 10 in FIG. 4 (block 304 in FIG. 3).

Figure 4:
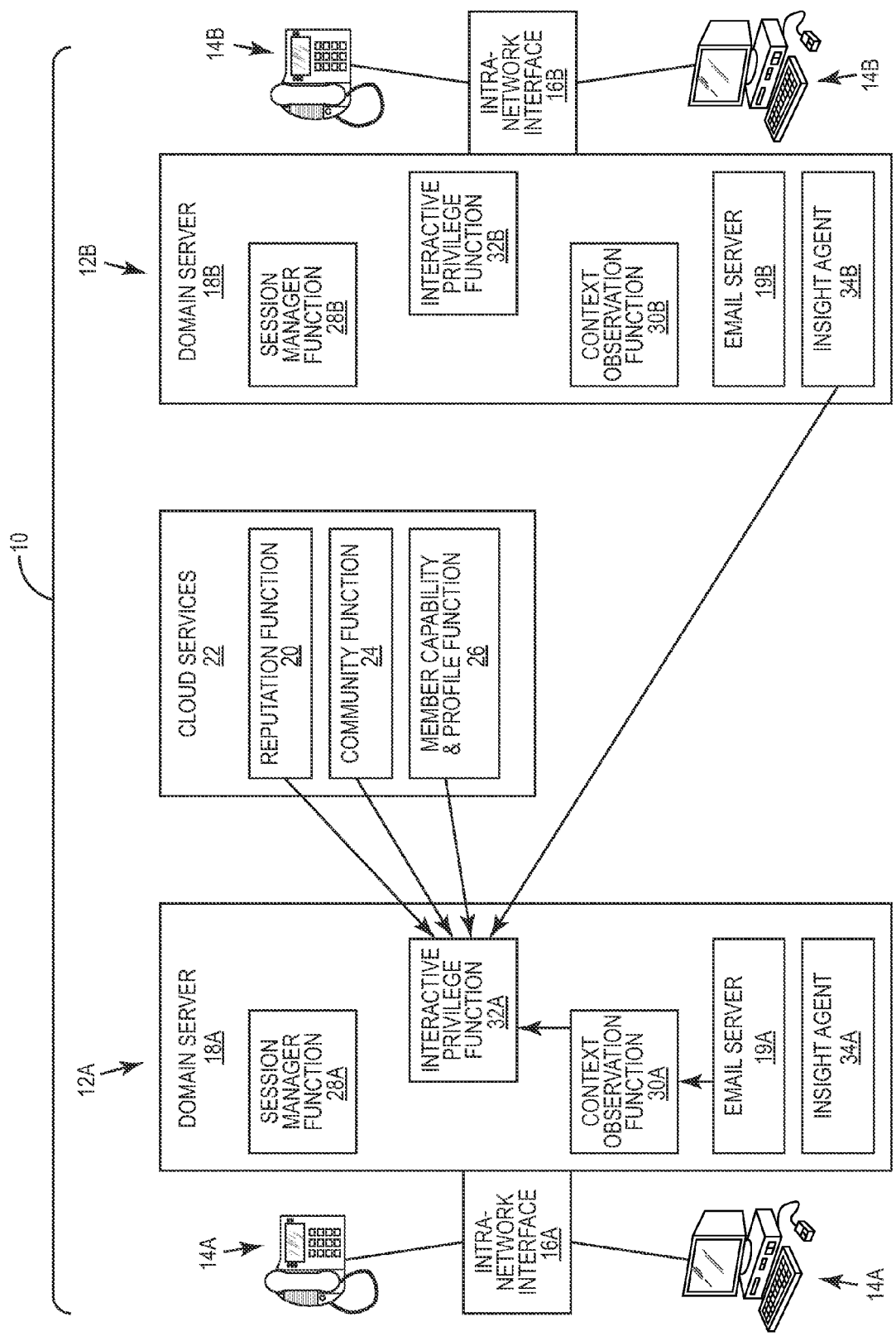
FIG. 4 is the exemplary system of FIG. 1 illustrating that a domain can receive insight information from various sources about an entity outside the domain.

As illustrated in FIG. 4, the interactive privilege function 32A is illustrated as being able to call upon the cloud services 22, particularly the reputation function 20, the community function 24, and/or the member capability and profile function 26. The interactive privilege function 32A is also illustrated in FIG. 4 as being able to call upon the insight agent 34B of the domain 12B to gain insight on an entity outside the domain 12A and inside the domain 12B. Although not illustrated in FIG. 4, the interactive privilege function 32B can call upon the same functions and insight agent 34A of domain 12A to gain insight on an entity outside the domain 12B and inside the domain 12A. It should be understood by those skilled in the art that any number of insight sources located either inside the domains 18A, 18B or inside any other domains that have insight about the domains 18A, 18B may be called upon to provide insight by the interactive privilege function 32A, 32B.

Figure 5:
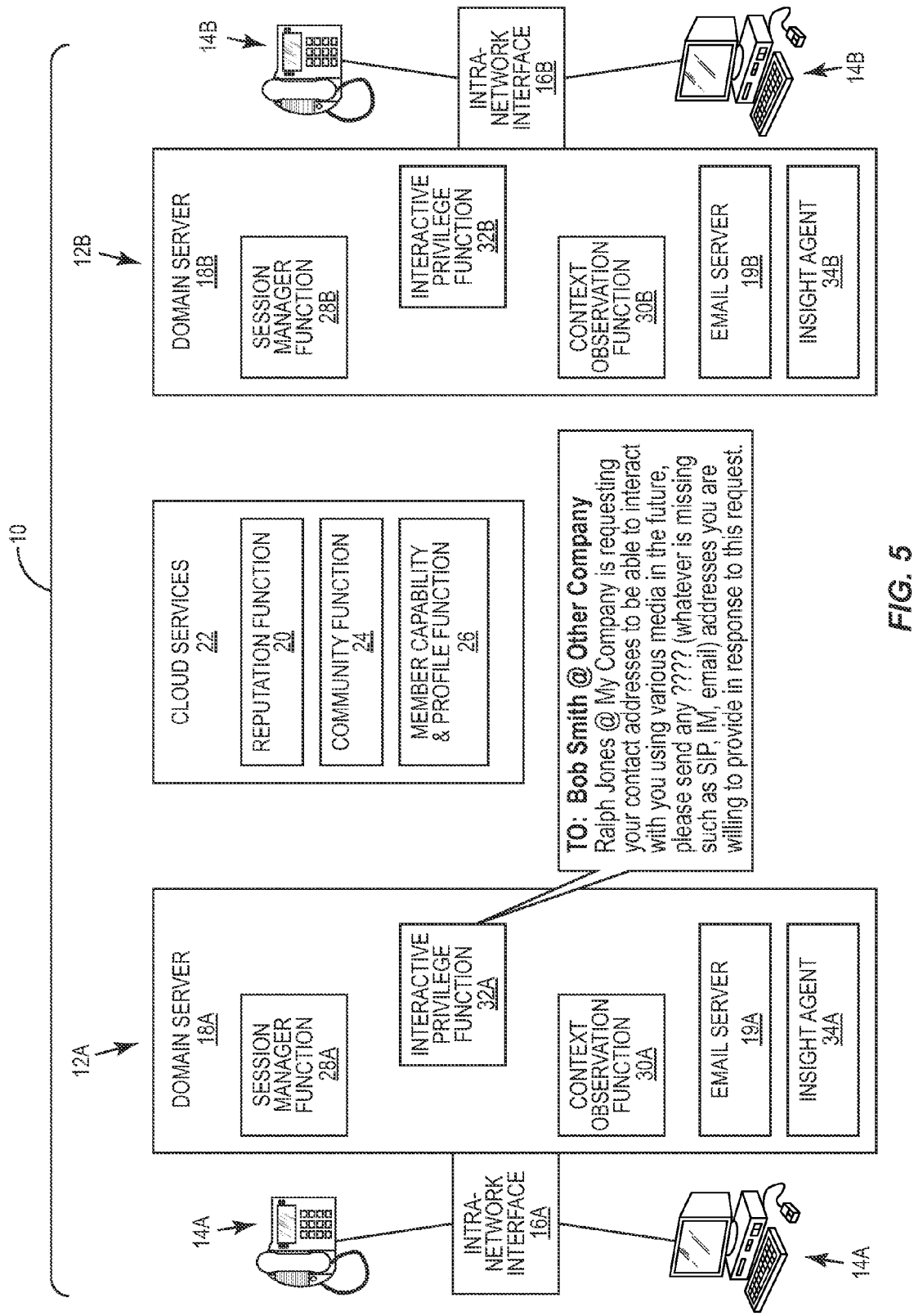
FIG. 5 is the exemplary system of FIG. 1 illustrating an exemplary message composed by the interactive privilege function to gather insight about an entity outside the domain which can be used to determine interactive communications privileges for the entity outside the domain.

As discussed above, one option in block 302B in FIG. 3 for the interactive privilege functions 32A, 32B to gather insight about an entity outside their respective domain 12A, 12B is to send a communication message to the entity outside the domain 12A, 12B to inquire as to their interactive communications capabilities and related address or other insight. This option is illustrated by example in the system 10 in FIG. 5. This option for gathering insight about an entity outside the domain 12A, 12B may be taken if, for example, insight cannot be gathered about the entity outside the domain by other means or gained with the sufficient or desired detail. As illustrated in FIG. 5, the interactive privilege function 32A in domain 12A is shown as having compiled a message 36 to be sent to Bob_Smith@Other_Company. Bob_Smith may be a user entity in the domain 12B. In this example, the "Other_Company" domain name identifies domain 12B. The message 36 is complied by the interactive privilege function 32A based on monitoring of interaction communications between Bob_Smith@Other_Company with Ralph_Jones@My_Company. Ralph_Jones is a user entity in domain 12A (see also, block 200 in FIG. 2). The "My_Company" domain name identifies domain 12A in this example.

With continuing reference to FIG. 5, the message 36 compiled by the interactive privilege function 32A indicates that user entity Ralph_Jones at domain My_Company (12A) is attempting to contact user entity Bob_Smith at domain Other_Company (12B) to gather insight information about user entity Bob_Smith. The message 36 asks Bob_Smith to send its communications capabilities and addresses for such capabilities to the My_Company domain (12A). The interactive privilege function 32A will receive insight information from Bob_Smith if Bob_Smith responses to message 36.

Whether Bob_Smith responds to the message 36 (e.g., block 302B in FIG. 3), or whether insight about Bob-Smith is gathered through other means (e.g., blocks 302A, 302C in FIG. 3), the interactive privilege function 32A will thereafter develop a possible set of interactive privileges for the entity outside the domain 12A based on the received insight information (block 306 in FIG. 3). In the present example, the interactive privilege function 32A will develop a possible set of interactive privileges for the user entity Bob_Smith outside the domain 12A, in the domain 12B based on the received insight information.

Figure 6:
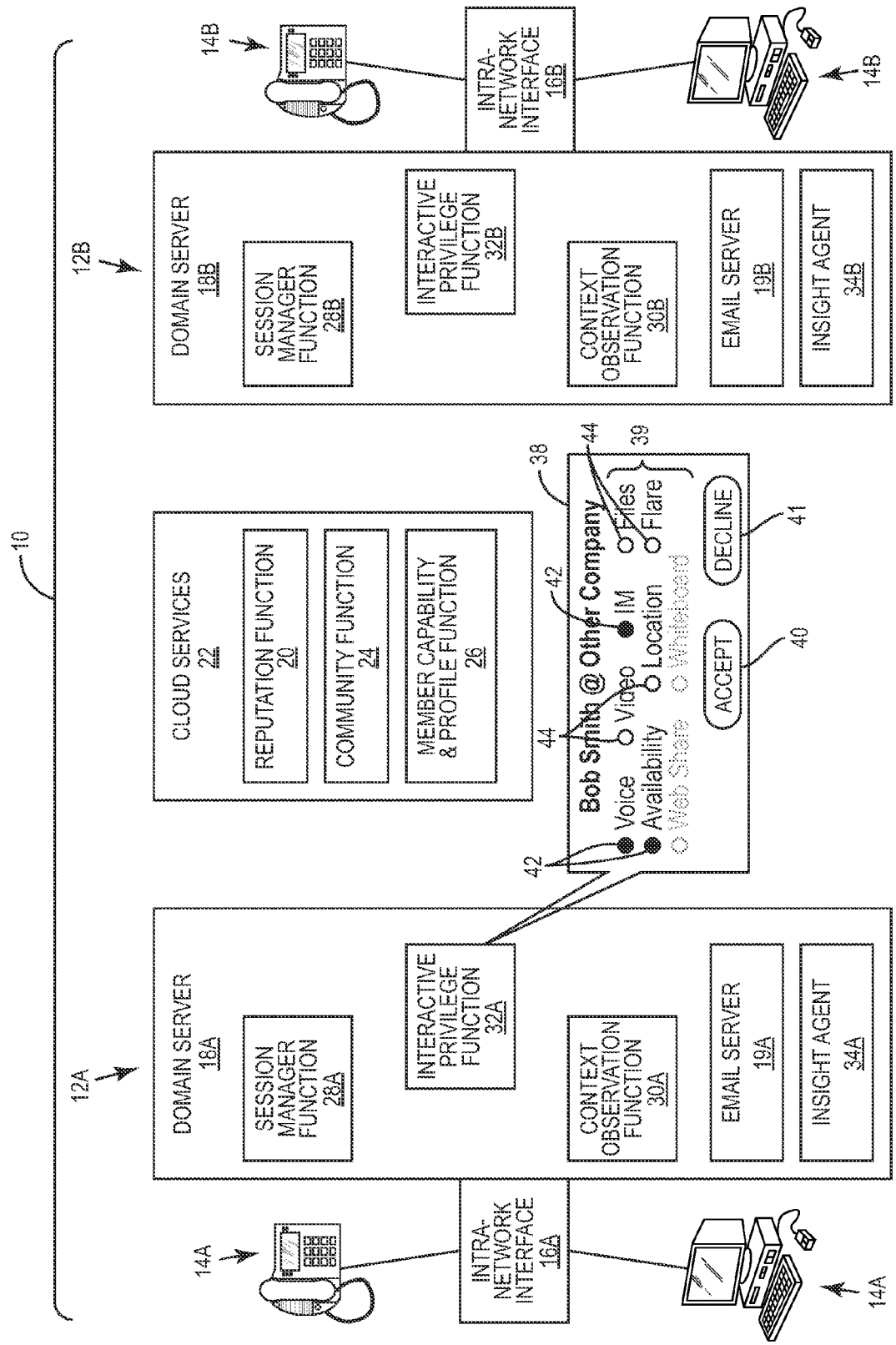
FIG. 6 is the exemplary system of FIG. 1 illustrating the exemplary interactive privilege function providing interactive communications privilege recommendations to an entity inside the domain regarding interactive communications with an entity outside the domain.

As illustrated by example in the system 10 in FIG. 6, the interactive privilege function 32A will thereafter send the developed set of interactive privileges 39 for the entity outside the domain 12A to the entity inside the domain 12A (block 308 in FIG. 3). Non-limiting examples of interactive communications privileges include voice communications, video communications, instant messaging (IM), file sharing, availability insight, location insight, web sharing, shared whiteboard, and the Avaya Flare® capability suite. Flare® is an interactive user interface enabling a variety of communications capabilities developed and marketed by Avaya, Inc. 211 Mount Airy Road, Basking Ridge, N.J. 07920, and is disclosed in more detail in U.S. patent application Ser. No. 12/948,140 filed on Nov. 17, 2011 entitled "METHOD AND SYSTEM FOR CONTROLLING AUDIO SIGNALS IN MULTIPLE CONCURRENT CONFERENCE CALLS," which is incorporated herein by reference in its entirety. In this example, the entity inside the domain 12A is user entity Ralph_Jones. As illustrated in FIG. 6, a message 38 is sent by the interactive privilege function 32A to the entity inside the domain 12A with pre-populated interactive communications types indicating that Voice, IM, and Availability interactive communications privileges for communications with the user entity Bob_Smith@Other_Company are possible and recommended to Ralph-Jones. Radio buttons 42 are automatically selected by the interactive privilege function 32A in the message 38 for recommended interactive communications privileges. Radio buttons 44 for interactive communications privileges that are not recommended but are allowable are automatically not selected by the interactive privilege function 32A in the message 38.

With continuing reference to FIG. 6, the user entity Ralph_Jones can choose to accept or decline these proposed interactive communications privileges by selecting either the "ACCEPT" button 40 or the "DECLINE" button 41, respectively (block 310 in FIG. 3). A user entity's ability inside the domain 12A, 12B to choose interactive communications privileges for the entity outside the domain 12A, 12B provides the self-learning of interactive communications privileges in this example. In this manner, an administrator is not tasked with maintaining all of the interactive communications privileges in a given domain 12A, 12B. The user entity can also choose to select other unselected radio buttons 44 to add additional interactive communications privileges for the entity outside the domain (e.g., Video, Files, Location, and Flare). The user entity can also choose to unselect selected radio buttons 42 to remove specific interactive communications privileges for the entity outside the domain (e.g., Voice, IM, and/or Availability).

With continuing reference to FIG. 6, if the user entity Ralph_Jones accepts the recommended interactive communications privileges for the user entity Bob_Smith, the selected interactive communications privileges (e.g., in this example: Voice, IM, and Availability) will be stored in the domain 12A as the interactive communications privileges for interactive communications between the user entity Ralph_Jones in domain 12A and the user entity Bob_Smith in domain 12B (block 312 in FIG. 3). If the user entity Ralph_Jones declines the recommended interactive communications privileges for the user entity Bob_Smith, system default interactive communications privileges stored for user entity Bob_Smith in domain 12B, if any were previously stored, will be retained (block 314 in FIG. 3). In either scenario, the interactive communications privileges will be used by a domain server 18A, 18B to determine whether to establish requested interactive communications with entities outside their respective domain 12A, 12B. Also note that two interactive communications types, Web Share and Whiteboard, are grayed out in the message 38. This means that the interactive privilege function 32A, 32B is preventing these interactive communications types from being selected by the user entity inside their respective domain 12A, 12B.

Figure 7:
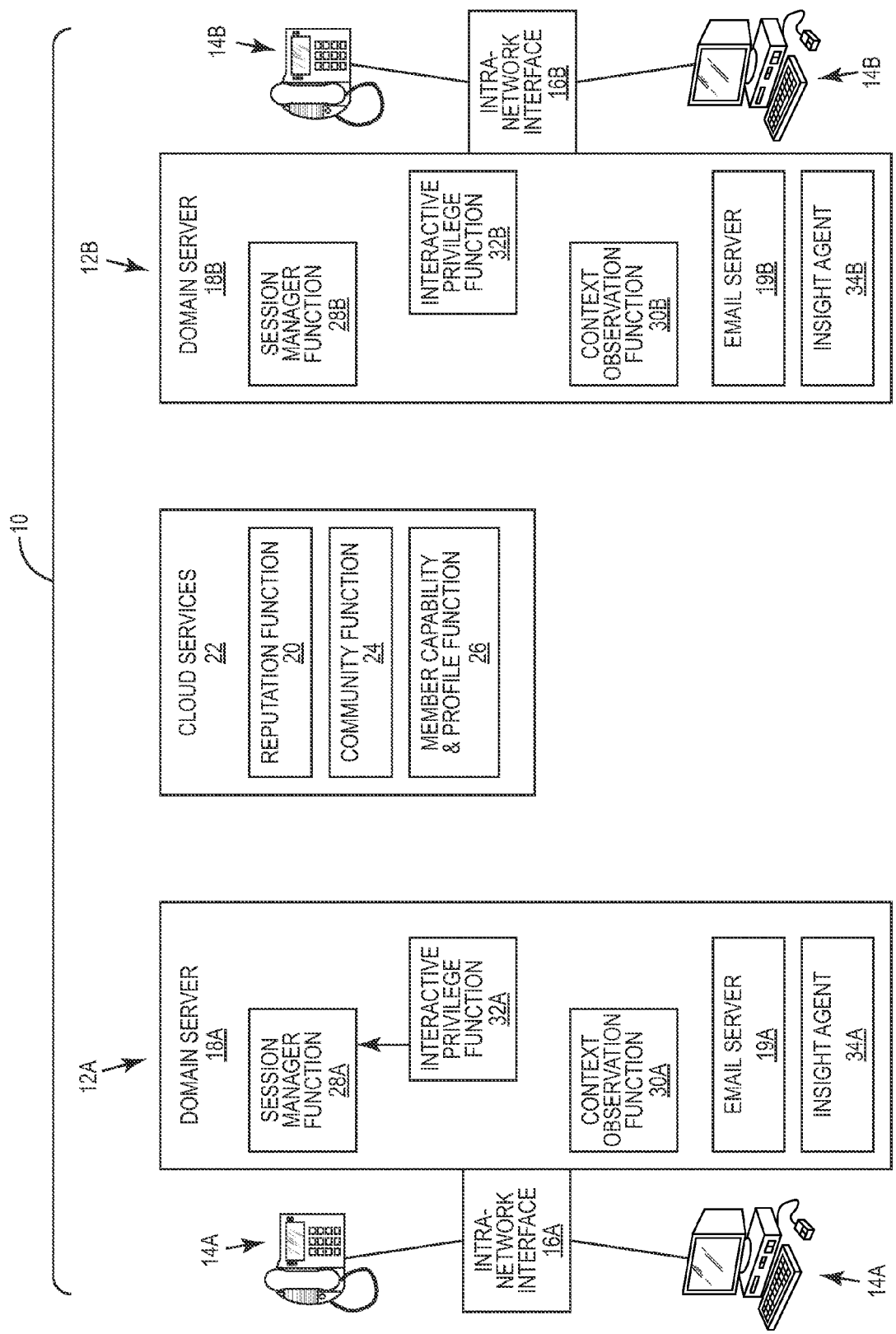
FIG. 7 is the exemplary system of FIG. 1 illustrating the exemplary session manager function configured to establish interactive communications between an entity inside the domain and an entity outside the domain based on interactive communications privileges configured for the outside the domain.

The interactive communications privileges will be used to determine whether a particular type of interactive communications session will be allowed to be established by a domain server 18A, 18B. In this regard, FIG. 7 illustrates the system 10 wherein the session manager functions 28A, 28B calls upon the interactive privilege functions 32A, 32B in their respective domain servers 18A, 18B when a request for interactive communications involves an entity outside their respective domains 12A, 12B. The interactive privilege function 32A provides the interactive privilege function for the entity outside the domain 12A, 12B to determine if the requested interactive communications should be allowed to be established between an entity inside the domain 12A, 12B and an entity outside the domain 12A, 12B. In this regard, FIG. 8 illustrates an exemplary flowchart that illustrates an exemplary processing performed by the session manager functions 28A, 28B to process a request for establishment of interactive communications involving entities inside their respective domains 12A, 12B.

Figure 8:
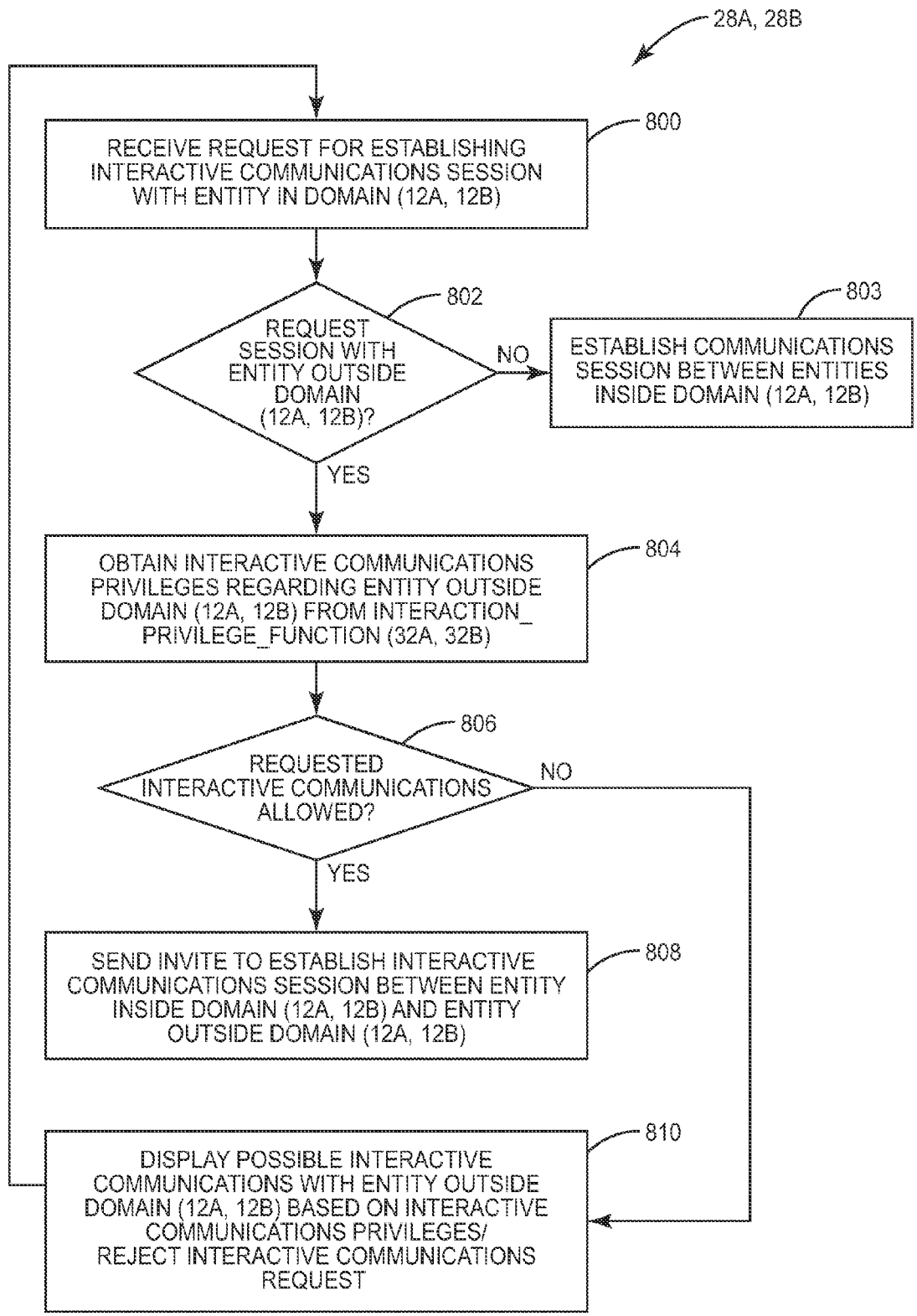
FIG. 8 is an exemplary flowchart illustrating a session manager function receiving a request for establishing an interactive communications session between an entity inside the domain and an entity outside the domain and determining if the interactive communications session is allowed based on the interactive communications privileges configured for the entity outside the domain.

With reference to FIG. 8, the session manager function 28A, 28B receives a request for establishing an interactive communications session with a party in their respective domains 12A, 12B (block 800). The session manager function 28A, 28B determines if the interactive communications request involves an entity outside their respective domain 12A, 12B (block 802). If no, the interactive communications request is between entities in the same domain 12A, 12B and are established without regard to the interactive communications privileges (block 803). If the interactive communications request involves an entity outside a domain 12A, 12B, the interactive communications privileges that are established and have been self-learned will be used to determine if the establishment of the interactive communications request involving the entity outside the domain 12A, 12B will be allowed by the respective session manager function 28A, 28B (block 804). The session manager function 28A, 28B obtains the interactive communications privileges regarding the entity outside the domain 12A, 12B by calling upon their respective interactive privileges function 32A, 32B (block 804). If the requested interactive communications are allowed according to the interactive communications privileges for the entity outside the domain 12A, 12B (block 806), the session manager function 28A, 28B allows or facilitates establishment of the interactive communications session between the entity inside the domain 12A, 12B and the entity outside the domain 12A, 12B (block 808). If the requested interactive communications are not allowed according to the interactive communications privileges for the entity outside the domain 12A, 12B (block 806), the requested interactive communications session is not established. In this scenario for outbound communications requests from the entity inside the domain to the entity outside the domain, the possible interactive communications with the entity outside the domain 12A, 12B based on the interactive communications privileges may be displayed to the entity inside the domain 12A, 12B for future outbound communications requests (block 810). In this scenario for inbound communications requests from an entity outside the domain to the entity inside the domain, the communications request may be simply rejected (block 810).

Figure 9:
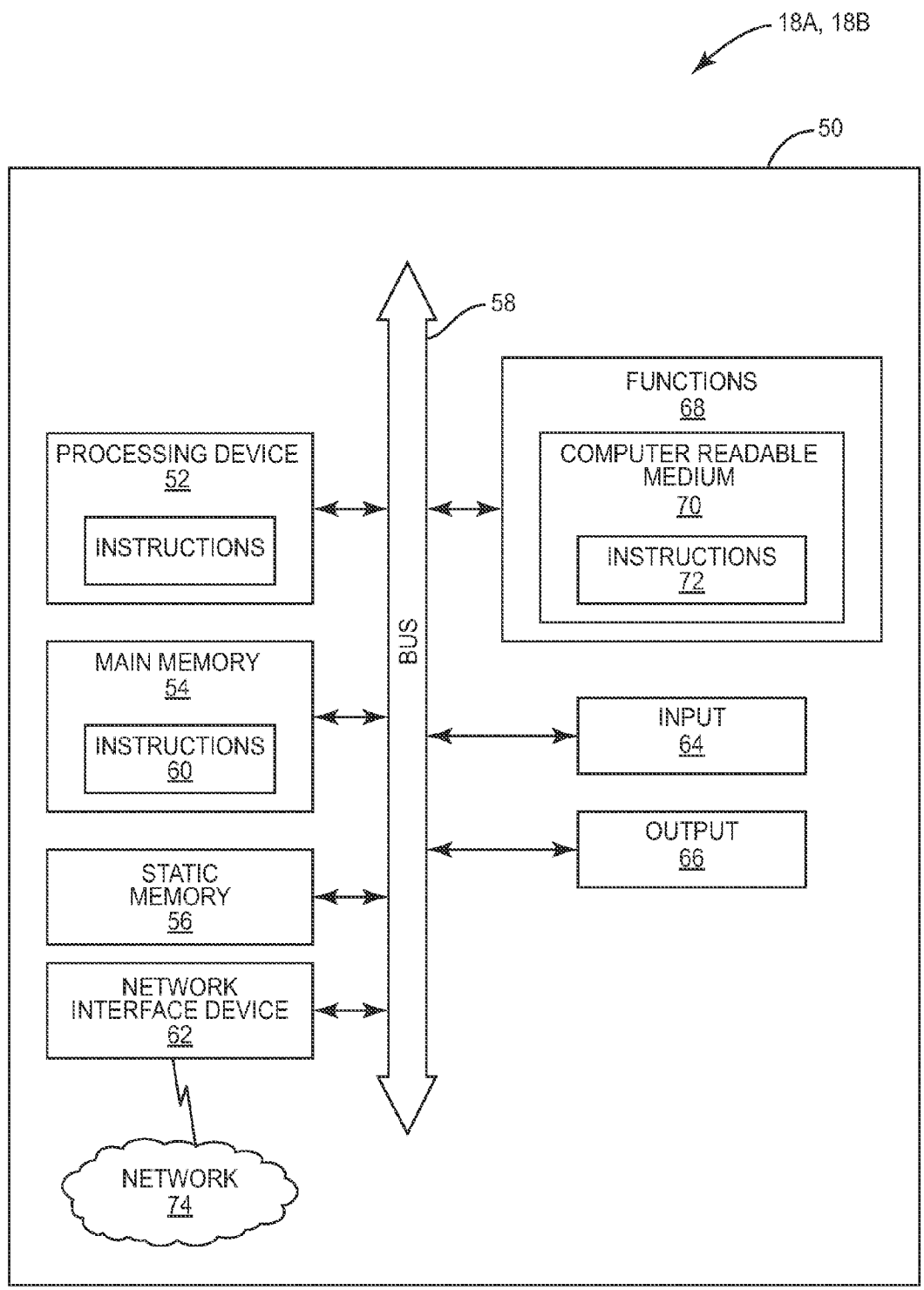
FIG. 9 is a schematic diagram representation of an exemplary domain server in the system in FIG. 1 and configured to execute instructions from an exemplary computer-readable medium to perform the functions described herein.

FIG. 9 is a schematic diagram representation of domain server 18A, 18B in the exemplary form of an exemplary computer system 50 adapted to execute instructions from an exemplary computer-readable medium to perform the functions described herein. In this regard, the domain server 18A, 18B may comprise the computer system 50 within which a set of instructions for causing the domain server 18A, 18B to perform any one or more of the methodologies discussed herein may be executed. The domain server 18A, 18B may be connected (e.g., networked) to other machines in a local area network (LAN), an intranet, an extranet, or the Internet. The domain server 18A, 18B may operate in a client-server network environment, or as a peer machine in a peer-to-peer (or distributed) network environment. While only a single domain server 18A, 18B is illustrated, the term "server" shall also be taken to include any collection of machines that individually or jointly execute a set (or multiple sets) of instructions to perform any one or more of the methodologies discussed herein. The domain server 18A, 18B may be a server, a personal computer, a desktop computer, a laptop computer, a personal digital assistant (PDA), a computing pad, a mobile device, or any other device and may represent, for example, a server or a user's computer.

The exemplary computer system 50 includes a processing device or processor 52, a main memory 54 (e.g., read-only memory (ROM), flash memory, dynamic random access memory (DRAM) such as synchronous DRAM (SDRAM), etc.), and a static memory 56 (e.g., flash memory, static random access memory (SRAM), etc.), which may communicate with each other via a bus 58. Alternatively, the processing device 52 may be connected to the main memory 54 and/or static memory 56 directly or via some other connectivity means.

The processing device 52 represents one or more processing devices such as a microprocessor, central processing unit, or the like. More particularly, the processing device 52 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 52 is configured to execute processing logic in instructions 60 for performing the operations and steps discussed herein.

The computer system 50 may further include a communications interface in the form of a network interface device 62. It also may or may not include an input 64 to receive input and selections to be communicated to the computer system 50 when executing instructions. It also may or may not include an output 66, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 50 may or may not include a data storage device that includes functions 68 stored in computer-readable medium 70 on which is stored one or more sets of instructions 72 (e.g., software) embodying any one or more of the methodologies or functions described herein. The functions 68 can include the session manager function 28A, 28B, the interactive privilege function 32A, 32B, the context observation function 30A, 30B, and the insight agent 34A, 34B as examples. The instructions 72 may also reside, completely or at least partially, within the main memory 54 and/or within the processing device 52 during execution thereof by the computer system 50, the main memory 54 and the processing device 52 also constituting machine-accessible storage media. The instructions 72 may further be transmitted or received over a network 74 via the network interface device 62. The network 74 can be an intra-network or an inter-network.

While the computer-readable medium 70 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the embodiments disclosed herein. The term "machine-accessible storage medium" shall accordingly be taken to include, but not be limited to, solid-state memories, optical and magnetic media, and carrier wave signals.

The devices, systems, methods, and computer-readable mediums arbitrating bus transactions on a communications bus based on bus device health information according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), an field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for self-learning interactive communications privileges to govern communications with an entity outside a domain, comprising:

monitoring communication of an entity inside the domain;
determining if the communication involves an entity outside the domain; and
if the communication involves an entity outside the domain:

gathering insight information about the entity outside the domain;
determining possible interactive communications privileges for the entity outside the domain based on the insight information;
sending the possible interactive communications privileges for the entity outside the domain to the entity inside the domain;
receiving a selection from the entity inside the domain of the possible interactive communications privileges for the entity outside the domain; and
storing the selection of the interactive communications privileges for the entity outside the domain.

2. The method of claim 1, further comprising:
receiving a request for establishing a communications session between the entity outside the domain and the entity inside the domain;
reviewing the interactive communications privileges for the entity outside the domain; and
determining if the requested interactive communications privileges allow the requested communications session between the entity outside the domain and the entity inside the domain.

3. The method of claim 2, further comprising establishing the requested communications session between the entity outside the domain and the entity inside the domain if the interactive communications privileges allow the requested communications session between the entity outside the domain and the entity inside the domain.

4. The method of claim 1, further comprising scoring the monitored communication involving the entity outside the domain.

5. The method of claim 1, further comprising determining if scoring the monitored communication involving the entity outside the domain exceeds a defined communications threshold level.

6. The method of claim 1, wherein gathering the insight information is comprised of gathering insight information about the entity outside the domain from an insight agent.

7. The method of claim 6, wherein the insight agent is located inside the domain.

8. The method of claim 6, wherein the insight agent is located outside the domain.

9. The method of claim 1, wherein gathering the insight information is comprised of gathering insight information about the entity outside the domain from the entity outside the domain.

10. The method of claim 9, further comprising sending a message to the entity outside the domain requesting the insight information about the entity outside the domain.

11. The method of claim 1, wherein gathering the insight information is comprised of gathering insight information about the entity outside the domain from a cloud service outside the domain.

12. The method of claim 1, wherein the insight information is comprised of at least one of a reputation, a community affiliation, an indication of trustworthiness, an entity capability, and a profile.

13. The method of claim 1, wherein the possible interactive communications privileges are comprised of at least one of voice, video, instant messaging, file sharing, availability insight, location insight, web share, and shared whiteboard.

14. The method of claim 1, further comprising determining recommended possible interactive communications privileges for the entity outside the domain.

15. A system for self-learning interactive communications privileges to govern communications with an entity outside a domain, comprising:
at least one communications interface associated with the domain;
a control system associated with the at least one communications interface and the domain, the control system configured to:
monitor communication of an entity inside the domain;
determine if the communication involves an entity outside the domain; and
if the communication involves an entity outside the domain, the control system is further configured to:
gather insight information about the entity outside the domain;
determine possible interactive communications privileges for the entity outside the domain based on the insight information;
send the possible interactive communications privileges for the entity outside the domain to the entity inside the domain;
receive a selection from the entity inside the domain of the possible interactive communications privileges for the entity outside the domain; and
store the selection of the interactive communications privileges for the entity outside the domain.

16. The system of claim 15, wherein the control system is further configured to:
receive a request for establishing a communications session between the entity outside the domain and the entity inside the domain;
review the interactive communications privileges for the entity outside the domain; and
determine if the requested interactive communications privileges allow the requested communications session between the entity outside the domain and the entity inside the domain.

17. The system of claim 16, wherein the control system is further configured to establish the requested communications session between the entity outside the domain and the entity inside the domain if the interactive communications privileges allow the requested communications session between the entity outside the domain and the entity inside the domain.

18. The system of claim 15, wherein the control system is configured to gather the insight information about the entity outside the domain from a cloud service outside the domain.

19. The system of claim 15, wherein the control system is further configured to determine recommended possible interactive communications privileges for the entity outside the domain.

20. A non-transitory computer-readable medium comprising computer executable instructions stored thereon to cause a control system associated with the at least one communications interface and a domain to:
monitor communication of an entity inside the domain;
determine if the communication involves an entity outside the domain; and
if the communication involves an entity outside the domain:
gather insight information about the entity outside the domain;
determine possible interactive communications privileges for the entity outside the domain based on the insight information;
send the possible interactive communications privileges for the entity outside the domain to the entity inside the domain;

receive a selection from the entity inside the domain of the possible interactive communications privileges for the entity outside the domain; and store the selection of the interactive communications privileges for the entity outside the domain.

21. The computer-readable medium of claim 20, wherein the computer executable instructions are further configured to cause the control system to:

receive a request for establishing a communications session between the entity outside the domain and the entity inside the domain;

review the interactive communications privileges for the entity outside the domain; and determine if the requested interactive communications privileges allow the requested communications session between the entity outside the domain and the entity inside the domain.

22. The computer-readable medium of claim 21, wherein the computer executable instructions are further configured to cause the control system to establish the requested communications session between the entity outside the domain and the entity inside the domain if the interactive communications privileges allow the requested communications session between the entity outside the domain and the entity inside the domain.

23. The computer-readable medium of claim 20, wherein the computer executable instructions are further configured to gather the insight information about the entity outside the domain from a cloud service outside the domain.

* * * * *